United States Patent
Phillips et al.

(10) Patent No.: US 6,261,484 B1
(45) Date of Patent: Jul. 17, 2001

(54) METHOD FOR PRODUCING CERAMIC PARTICLES AND AGGLOMERATES

(75) Inventors: Jonathan Phillips; Seth S. Gleiman, both of Santa Fe; Chun-Ku Chen, Albuquerque, all of NM (US)

(73) Assignee: The Regents of the University of California, Los Almos, NM (US)

( * ) Notice: Subject to any disclaimer, the term of this patent is extended or adjusted under 35 U.S.C. 154(b) by 0 days.

(21) Appl. No.: 09/637,172

(22) Filed: Aug. 11, 2000

(51) Int. Cl.[7] .................................................. B29B 9/00

(52) U.S. Cl. .............................................. 264/5; 264/430

(58) Field of Search .............................. 264/5, 6, 11, 12, 264/430

(56) References Cited

U.S. PATENT DOCUMENTS

| | | | |
|---|---|---|---|
| 4,689,075 | * 8/1987 | Uda et al. | 75/0.5 B |
| 5,989,648 | 11/1999 | Phillips | 427/456 |

OTHER PUBLICATIONS

H. Shim, J. Phillips, and I.S. Silva, "Restructuring of alumina particles using a plasma torch," J. Mater, Res., vol. 14, No. 3, Mar. 1999, pp. 849–854.

\* cited by examiner

Primary Examiner—Christopher A. Fiorilla
(74) Attorney, Agent, or Firm—Samuel L. Borkowsky

(57) ABSTRACT

A method for generating spherical and irregularly shaped dense particles of ceramic oxides having a controlled particle size and particle size distribution. An aerosol containing precursor particles of oxide ceramics is directed into a plasma. As the particles flow through the hot zone of the plasma, they melt, collide, and join to form larger particles. If these larger particles remain in the hot zone, they continue melting and acquire a spherical shape that is retained after they exit the hot zone, cool down, and solidify. If they exit the hot zone before melting completely, their irregular shape persists and agglomerates are produced. The size and size distribution of the dense product particles can be controlled by adjusting several parameters, the most important in the case of powder precursors appears to be the density of powder in the aerosol stream that enters the plasma hot zone. This suggests that particle collision rate is responsible for determining ultimate size of the resulting sphere or agglomerate. Other parameters, particularly the gas flow rates and the microwave power, are also adjusted to control the particle size distribution.

27 Claims, 6 Drawing Sheets

METHOD FOR PRODUCING CERAMIC PARTICLES AND AGGLOMERATES

This invention was made with government support under Contract No. W-7405-ENG-36 awarded by the U.S. Department of Energy to The Regents to the University of California. The U.S. Government has certain rights in the invention.

FIELD OF THE INVENTION

The present invention relates generally to ceramics, and more particularly to a method for making spherical particles and irregularly shaped agglomerates of oxide ceramics having a controlled particle size and particle size distribution.

BACKGROUND OF THE INVENTION

The present market for spherical ceramic particles is dominated by spherical silica because silica spheres are available in a wide variety of sizes at low cost. However, the thermal conductivity, electrical conductivity, and other properties of silica are not optimal for many important applications. Alumina ($Al_2O_3$), for example, has a higher thermal conductivity and lower electrical conductivity than silica, and would likely replace spherical silica for some applications if a low-cost, commercial scale method of preparing spherical $Al_2O_3$ of a controlled size of about 10–200 micron ($\mu$m) diameter, and a controlled particle distribution were available.

Methods for preparing spherical $Al_2O_3$ particles are known. These methods generally require plasmas generated from both high power (about 10 kW) and low power (about 1 kW) sources. Although spherical $Al_2O_3$ particles can be generated by high power methods such as ablation from aluminum electrodes or vaporization of powdered precursors that nucleate and grow to form spheres require high power sources, control of spherical particle size is not possible using high power methods.

The use of low power microwave plasma to produce spherical $A_2O_3$ was reported by H. Shim et al. entitled "Restructuring of Alumina particles Using a Plasma Torch", which appeared in *J. Mat. Res.* 14, 849 (1999), and in U.S. Pat. No. 5,989,648 to J. Phillips entitled "Plasma Generation of Supported Metal Catalysts," which issued on Nov. 23, 1999. The teachings of both Shim et al. and the '648 patent are incorporated by reference herein. Both Shim et al. and the '648 patent describe crystalline spherical $Al_2O_3$ particles that were generated by exposing precursor $Al_2O_3$ powder particles to a low power (>1 kW) microwave plasma. A comparison of the particle size/particle size distributions of the powder particles used with the spherical product particles produced for both the Shim paper and the '648 patent shows that the average input powder particle is larger than the product spherical particle. Importantly, the data strongly suggest that each spherical particle was produced from a single precursor powder particle.

Clearly, a low cost method for generating micron scale particles of aluminum oxide, magnesium oxide, titanium oxide, iron oxide, nickel oxide, and other oxide ceramics of a controlled particle size and particle size distribution is highly desirable.

Therefore, an object of the present invention is a general, low cost method for generating spherical oxide ceramic particles in the micron size range.

Another object of the invention is a method of making oxide ceramic particles having a controlled size and size distribution.

Still another object of the invention is a method of making spherical alumina particles having a controlled size and size distribution in the micron size range.

Yet another object of the invention is a method of producing irregularly shaped, hard, ceramic agglomerates having macroscopic pores and of a controlled particle size and particle size distribution.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention as embodied and broadly described herein, the present invention includes a general method of generating spherical ceramic particles. An aerosol of precursor ceramic particles suspended in a plasma gas is prepared. A plasma is generated from plasma gas. The plasma includes a plasma hot zone that is sufficiently hot to melt the ceramic particles. The aerosol is directed into the plasma hot zone. As the particles pass through the hot zone, they melt at least partially, collide, and join to form larger particles. As these larger particles exit the hot zone, they cool, solidify, and are collected.

If these larger, partially molten particles remain in the hot zone until they melt completely, they naturally acquire a spherical shape that is retained after they exit the hot zone, whereupon the molten spheres solidify and are collected as hard, dense, crystalline ceramic particles. However, if the partially molten particles do not remain in the plasma hot zone until they melt completely, they exit the zone with irregular shapes and are collected after cooling and solidification as agglomerates having macroscopic-sized pores.

The particle size and particle size distribution for both the spherical particles and agglomerates can be controlled by adjusting various parameters, which include the density of precursor particles in the aerosol that enter the hot zone, the flow rates of the aerosol gas and the plasma gas, the amount of time that precursor particles remain in the plasma hot zone, the composition of the plasma gas and the aerosol gas, and the amount of power used to generate the plasma.

BRIEF DESCRIPTION OF THE DRAWINGS

The accompanying drawings, which are incorporated in and form a part of the specification, illustrate embodiments of the present invention and, together with the description, serve to explain the principles of the invention.

In the Figures.

DETAILED DESCRIPTION OF THE INVENTION

Briefly, the invention includes a method for producing spherical oxide ceramic particles and irregularly shaped ceramic agglomerates having a controlled particle size and particle size distribution. A precursor material consisting of small irregularly shaped powder particles of ceramic oxide is transformed into a product consisting of larger spherical particles and agglomerates of the ceramic oxide. An aerosol of precursor oxide ceramic material, generally in the form of powder particles, is introduced into plasma. As the precursor particles in the aerosol flow through the hot zone of the plasma they melt, at least partially, and then collide and join together to form larger particles. These larger particles naturally acquire a spherical shape if allowed to remain in the hot zone until they are completely molten. As the molten spheres exit the plasma, they cool, solidify, and are recovered as hard, dense, crystalline particles of spherical oxide ceramic. If the larger particles do not melt completely before they exit the hot zone, hard, dense irregularly shaped particles called "agglomerates" are formed. These agglomerates are robust and can be used for a variety of applications. They can, for example, be used in fluidized beds as catalysts. They can also be used as supports for catalysts. Since agglomerates have inner cavities large enough to hold catalyst particles, but have pores too small for these particles to fit through, they can be used as "catalyst particle cages" that surround catalyst particles. These cages prevent, or at least attenuate, catalyst attrition resulting from collisions between catalyst particles, and have macroscopic pores that are too small for the enclosed catalyst particles to escape but large enough to permit reactant gases and liquids to enter the pores and interact with the enclosed catalyst particles. Importantly, depending on the conditions under which they are formed, the method of the present invention provides either spherical or agglomerate products, and also allows the shapes, particle sizes, and particle size distribution of these products to be controlled as desired. Reference will now be made in detail to the present preferred embodiments of the invention. Similar or identical structure is identified using identical callouts.

Figure 1:
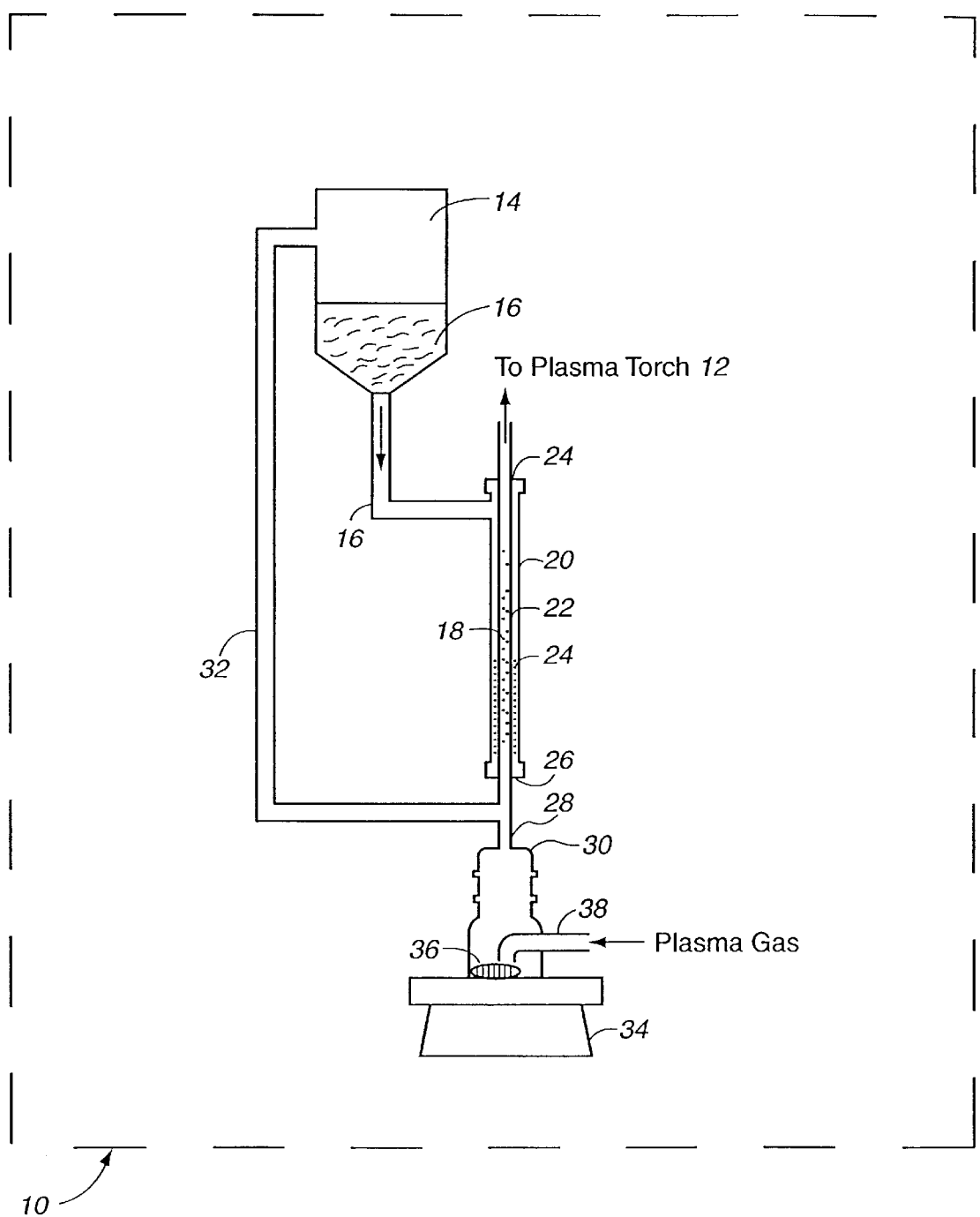
FIG. 1 shows a schematic representation of the apparatus that was used to generate a particle aerosol and deliver it to a microwave plasma.

FIG. 1 shows a schematic representation of the particle feeder apparatus 10 that was used to generate an oxide ceramic particle aerosol of a controlled particle density, and deliver the aerosol to a plasma torch 12. Particle feeder 10 includes particle reservoir 14 that contains small (about 0.75–6 μm), dry, irregularly shaped $Al_2O_3$ powder particles 16. Powder particles 16 are held inside reservoir 14 by frictional forces. Powder flows from reservoir 14 through conduit 16 and is collected within chamber 18, which is defined by the volume between outer tube 20 and coaxial inner tube 22 after sealing the upper end 24 and the lower end 26 of outer tube 24 to coaxial inner tube 26. As shown in FIG. 1, the portion of inner tube 22 defining a wall of chamber 18 is perforated in order to allow powder to flow out of chamber 18. Lower end 28 of inner tube 22 is connected to container 30. Pressure equalizing tube 32 provides fluid communication between reservoir 14 and container 30. Container 30 rests upon magnetic stir plate 34 that activates a magnetic bar 36 inside container 30. As stir bar 36 moves, it induces vibrations in apparatus 10 that cause powder to flow from reservoir 14 through conduit 16, into chamber 18, and through the perforations in inner tube 22. Gas flows into container 30 via inlet 38. As this gas flows through container 30 and up through inner tube 22, it combines with precursor oxide ceramic powder from chamber 18 to form the aerosol, which flows upward to plasma torch 12.

Figure 2:
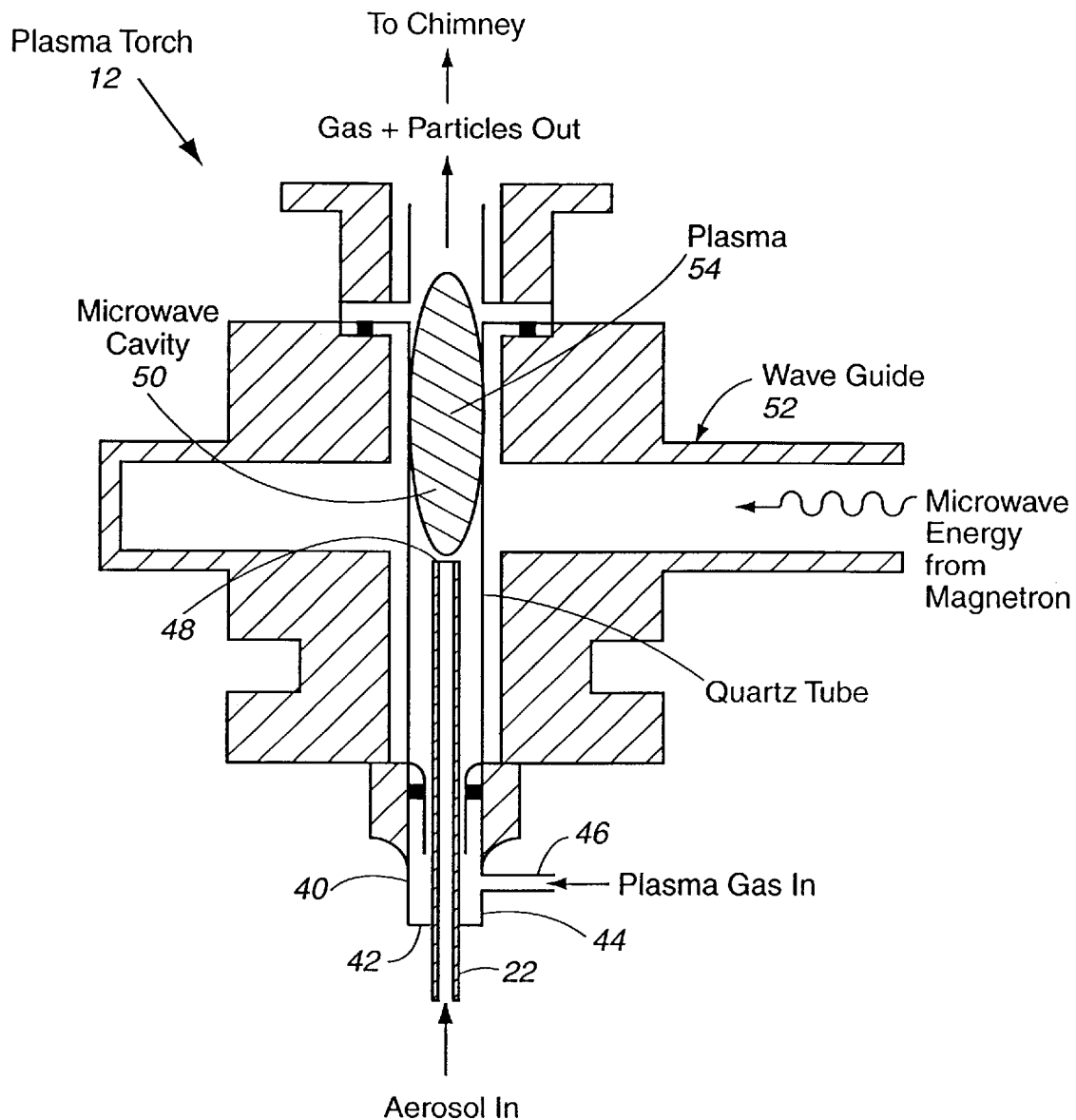
FIG. 2 shows a schematic, cross-sectional representation of a microwave plasma torch.
Figure 3:
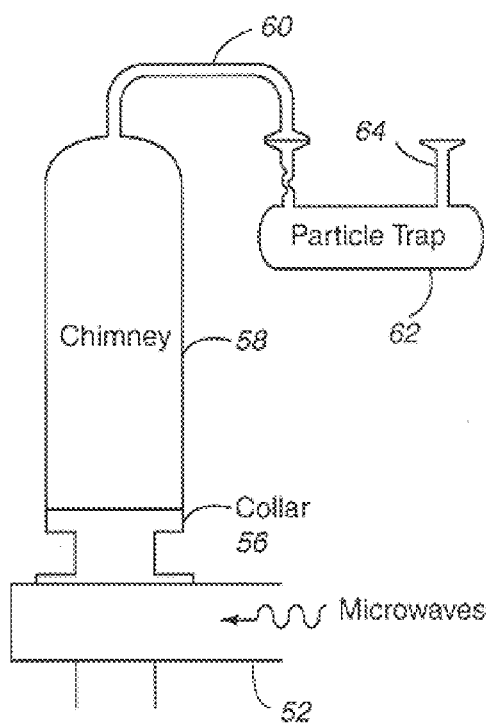
FIG. 3 shows a schematic representation of a particle collector.

FIG. 2 shows a schematic, cross-sectional representation of plasma torch 12. Inner ceramic tube 22 passes through coaxial outer quartz tube 40 and seals against the lower end 42 of quartz tube 40. A non-aerosol-containing stream of plasma gas enters lower portion 44 of quartz tube 38 through inlet 46. Upper end 48 of inner tube 22 extends into microwave cavity 50, where the aerosol stream and plasma gas stream converge. Microwave energy generated by a magetron (not shown) is directed through waveguide 52 into microwave cavity 50. This energy interacts with the combined gas streams inside cavity 50 and transforms it into plasma 54. As aerosol passes into the hot zone of the plasma, ceramic precursor powder particles from the aerosol begin to melt. The partially melted particles collide and join to form larger particles. After exiting the hot zone, they flow through collar 56, shown in FIG. 3, and into chimney 58. They exit chimney 58 through connecting tube 60 and into particle trap 62 where they are collected. Plasma gas exits particle trap 62 through exit port 64.

There are commercially available particle feeders available that can be used instead of the particular one described herein. The apparatus should allow the melted particles to collide while they are in the molten state. This way, they can join to form larger particles and continue to melt if spherical particles are desired. They can also be removed from the energy source before melting completely so that as they cool down, they solidify to form agglomerates.

Energy from sources other than a microwave generator can be used with the invention. Other types of electromagnetic energy, and energy from a DC discharge, for example, can also be used. The energy source need only be one that supplies sufficient energy to melt the particles without decomposing them. Energy sources providing about 100–30,000 Watts of power can be used. Preferably, a range of about 300–1200 watts is used since this is usually sufficient to melt most oxide ceramic materials.

Figure 4:
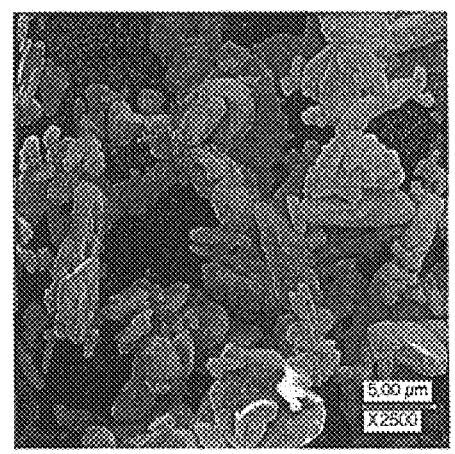
FIG. 4 shows a scanning electron micrograph of $\alpha$-$Al_2O_3$ precursor powder particles that were used to demonstrate the method of the present invention.
Figure 5:
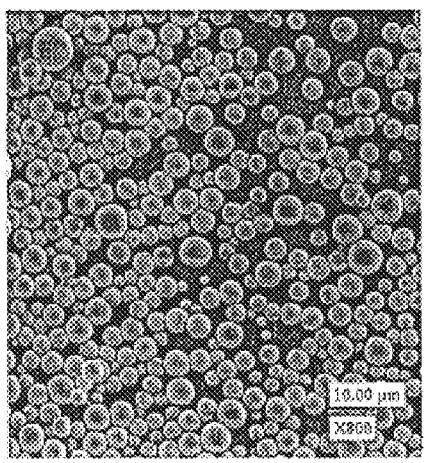
FIG. 5 shows scanning electron micrographs of spherical crystalline $Al_2O_3$ particles made using the method of the present invention.
Figure 6:
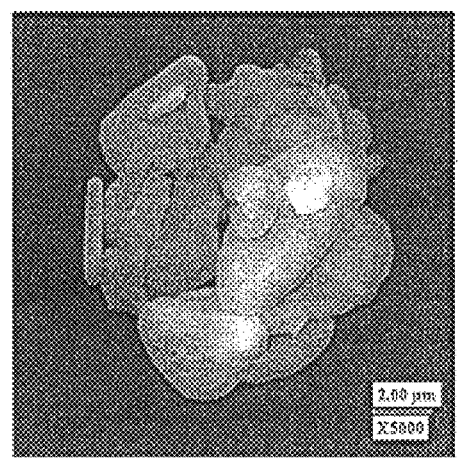
FIG. 6 shows a scanning electron micrograph of an irregular shaped partially crystalline $Al_2O_3$ particle made using the method of the present invention.

It should be understood that the method is general and that many ceramic materials can also be used with the invention. Alumina ($Al_2O_3$), silica ($SiO_2$), titanium oxide, magnesium oxide, nickel oxide, iron oxide, chromium oxide, manganese oxide, cobalt oxide, zirconium oxide, hafnium oxide, tantalum oxide, niobium oxide, tungsten oxide, lanthanum oxide, cerium oxide, praseodymium oxide, just to name a few ceramic materials, can be used with the invention. We demonstrated the method of the present invention using precursor $Al_2O_3$ powder, a scanning electron micrograph of which is shown in FIG. 4. FIG. 5 and FIG. 6 show scanning electron micrographs of spherical $Al_2O_3$ particles and of a partially crystalline $Al_2O_3$ agglomerate particle, respectively, that were formed using the method of the present invention.

We now present results from the $Al_2O_3$ example to illustrate how particle shapes, particle sizes, and particle size distributions are controlled according to the method of the present invention. We first turn to Table 1 below, which correlates the flow rate of aerosol gas with the flow rate of flow rate of precursor $Al_2O_3$ powder using apparatus 10. Flow rate of aerosol gas was measured in units of slpm, standard liters per minute, where standard conditions include a temperature of 300 K and a pressure of 1 atmosphere. Flow rate of $Al_2O_3$ powder was measured in units of milligrams of $Al_2O_3$ powder per hour.

TABLE 1

| Flow Rate of Aerosol Gas (slpm) | Flow Rate of $Al_2O_3$ Powder (mg/hr) |
|---|---|
| 0.186 | 1.54 |
| 0.357 | 7.20 |
| 0.529 | 19.80 |
| 0.701 | 48.00 |

The data of Table 1 show that that the flow rate of $Al_2O_3$ powder increases monotonically with an increase in the flow rate of aerosol gas. This is not necessarily general behavior, and other particle feeders, could offer independent control of aerosol gas flow rate and powder particle flow rate. In addition, we have observed that the flow rate of powder appears to increase after ignition of plasma gas to form the plasma.

The Figures and accompanying description that follow show how the invention can be used to produce a variety of particle shapes, particle sizes, and particle size distributions for the chosen example. The sizes and size distributions of particles collected from particle trap 42 are controlled by adjusting the size and temperature of the plasma hot zone, powder particle density, and residence time of particles in the hot zone. These parameters are varied by adjusting the composition of plasma gas and aerosol gas, by adjusting the individual flow rates of the plasma gas and the aerosol gas, and by adjusting the microwave power absorbed by the plasma. It should be noted that specific adjustments that are intended to affect one parameter could also affect other parameters. Adjustments to the aerosol gas flow rate, for example, affect both the powder particle density in the aerosol and the temperature of the hot zone of the plasma. Similarly, adjustments to the plasma gas flow rate affect both the temperature of the hot zone and the length of time that particles reside in the hot zone. FIG. 7 shows a graph that indicates how various combinations of plasma gas flow rate and aerosol gas flow rate affect particle shape for $Al_2O_3$ particles produced with an argon plasma generated using 500 watts of microwave power. It is apparent from FIG. 7 spherical particles of $Al_2O_3$ can be produced within a range of combinations of flow rates of plasma gas and aerosol gas. In particular, if particles of crystalline, spherical $Al_2O_3$ are desired, an aerosol gas flow rate less than about 0.75 slpm and a plasma gas flow rate less than about 1.6 slpm should be used. If agglomerates of $Al_2O_3$ are desired, a flow rate of aerosol gas higher than about 0.75 slpm and a flow rate of plasma gas higher than about 1.6 slpm should be used.

The graphical representation of FIG. 8 shows a nearly linear relationship between the average particle size of spherical $Al_2O_3$ and the mass per unit volume of $Al_2O_3$ powder in the aerosol, i.e. the mass density of $Al_2O_3$, that enters the plasma hot zone. We see that increases in the mass density lead also to increases in the particle size. The average particle volume, in particular, appears to change by about a factor of ten from the high-mass density end of the graph to the low-mass density end of the graph.

This indicates that about ten times as many powder particles join to form spherical $Al_2O_3$ particles at the high-mass density end than at the low-mass density end. Mass densities of about 0.01–100 grams of powder per liter of aerosol can be used, preferably about 0.5 gram of powder per liter of aerosol.

What follows is a reasonable interpretation of the data presented in FIG. 8 that explains how the control of mass density is important in providing particles of a controlled size and size distribution. As mass density of $Al_2O_3$ powder in the aerosol increases, more particles enter the hot zone of the plasma. This results in a higher collision frequency between particles, which results in the production larger and larger particles. This explanation is supported by the trend in increased volume average size of spherical particles with increasing mass density of powder in the aerosol. When the plasma is not provided with sufficient microwave power to generate enough heat to melt all of the particles, agglomerates are produced. However, when microwave power is increased, the particles formed in the plasma hot zone are hotter, melt completely, naturally acquire a spherical shape, and are significantly larger than the particles that are produced using lower microwave powder but the same mass density of $Al_2O_3$ powder. We thus see how various combinations of plasma temperature and mass density of $Al_2O_3$ powder are used to control the shape of the particle products.

The choice of plasma gas and aerosol gas composition can also affect the average particle size and particle size distribution. Plasma gases can include air, argon, neon, xenon, nitrogen, oxygen, chlorine, fluorine, hydrogen, and mixtures thereof. Gas pressures of about 0.10–10 atmospheres can be used. Preferably a gas pressure of about 1 atmosphere is used. FIG. 9 shows a histogram of the particle size distribution for the $\alpha$-$Al_2O_3$ powder used to produce spherical $Al_2O_3$. FIGS. 10*a,b* show histograms of particle size distributions for spherical $Al_2O_3$ produced from an argon plasma, and FIG. 10*c*shows a histogram for spherical $Al_2O_3$ produced from a dry air plasma (20% $O_2$, 79% $N_2$,1% Ar). About 500 watts of microwave power was used to generate both plasmas. The combination of plasma gas flow rate (1.358 slpm) and aerosol gas flow rate (0.1860 slpm) resulted in the production of crystalline $Al_2O_3$ spheres having the distribution shown in FIG. 10*a*, from which a mean diameter of 4.43 microns was calculated. The combination of an increased plasma gas flow rate (1.544 slpm) and an increased aerosol gas flow rate (0.3567 slpm) produced crystalline $Al_2O_3$ spheres having the distribution shown in FIG. 10*b*, from which a mean diameter of 8.56 microns, larger than that for FIG. 10*a*, was calculated.

The composition of plasma gas also can affect particle size. The argon plasma gas was substituted with dry air plasma gas. The combination of a 0.8109 slpm flow rate for the air plasma gas and an 0.7013 slpm aerosol gas flow rate produced the distribution shown in FIG. 10*c*, from which a particle mean diameter of 10.76 microns, even larger than those produced using argon plasma, was obtained. Therefore, changes in plasma gas composition affect product particle size. Interestingly, it appears that the argon plasma also provided a narrower particle size distribution of spherical $Al_2O_3$ than the dry air plasma.

We estimated limits to the mass of $Al_2O_3$ powder precursor that can be processed through the hot zone to provide dense $Al_2O_3$ spheres having a given average particle size. At 500 W of microwave power, assuming a perfectly efficient process, no fluctuations in aerosol flow rate, and 50% of the microwave power used to maintain the plasma, and using the heat of melting of $Al_2O_3$, we estimate a maximum powder particle flow rate of about 55 g/hr. If the microwave power is increased in order to process more powder, larger spheres are produced.

Figure 8:
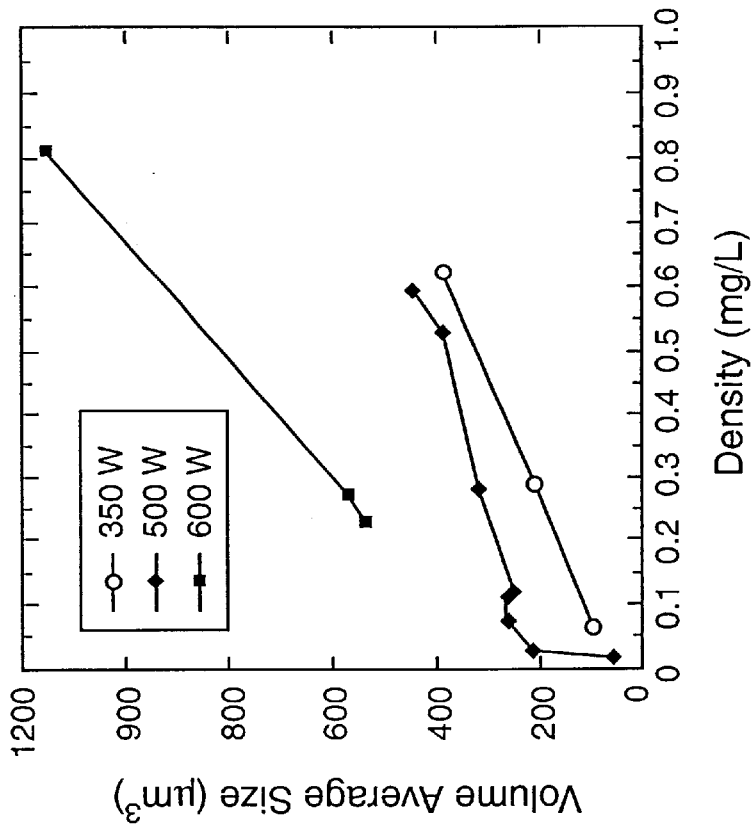
FIG. 8 shows a graphical representation of the volume average particle size for spherical $Al_2O_3$ particles produced versus mass density of $Al_2O_3$ powder traveling through a microwave torch at three different power settings.
Figure 7:
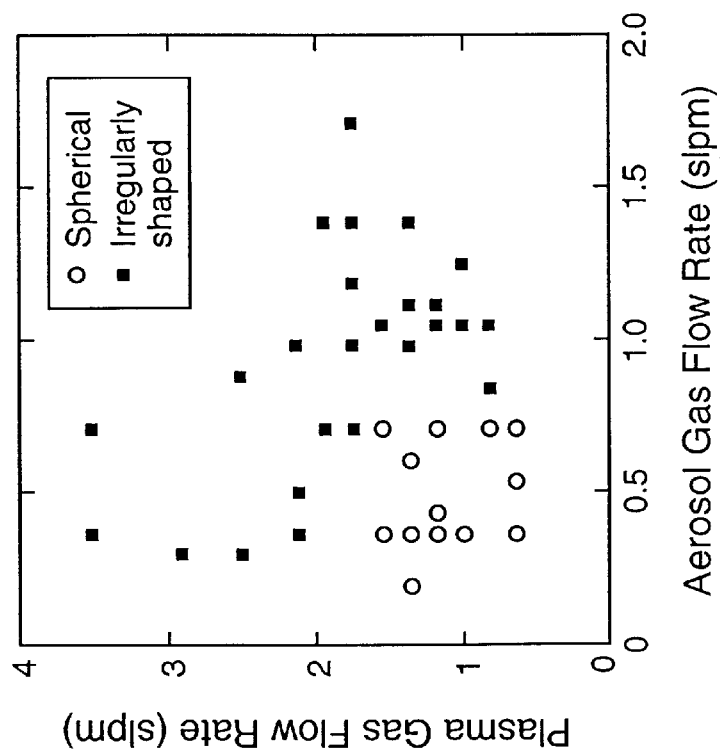
FIG. 7 shows a graphical representation of the effects of plasma gas flow rate and aerosol gas flow rate on particle shape for an microwave generated argon plasma.
Figure 9:
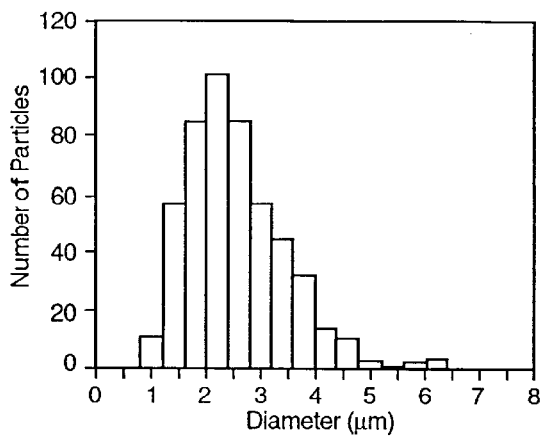
FIG. 9 shows a graphical representation of the particle size distribution of the $\alpha$-$Al_2O_3$ precursor powder particles used to demonstrate the invention.
Figure 10A:
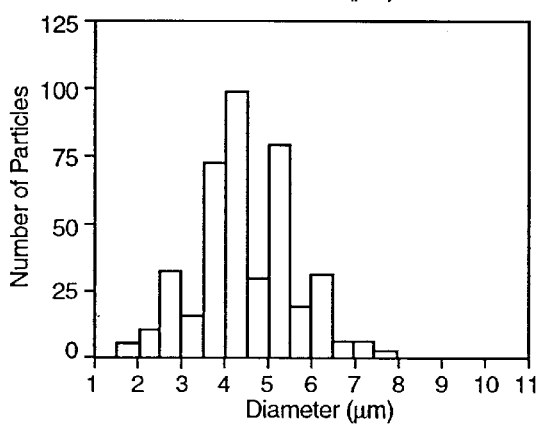
FIGS. 10a,b show graphical representations of the particle size distribution of the spherical crystalline $\alpha$-$Al_2O_3$ particles produced from an argon plasma using the powder of FIG. 9.
Figure 10B:
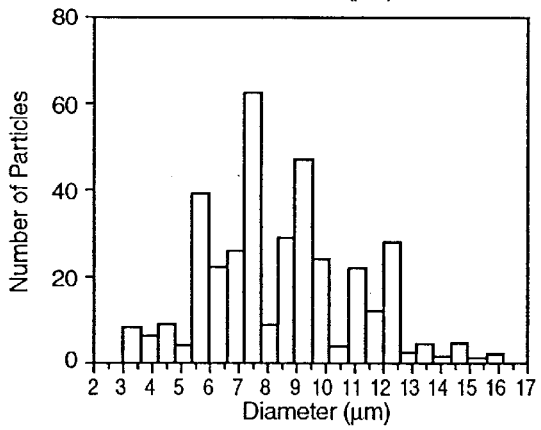
FIG. 10c shows a graphical representation of the particle size distribution for spherical $\alpha$-$Al_2O_3$ particles produced from a microwave generated air plasma using the powder of FIG. 9.
Figure 10C:
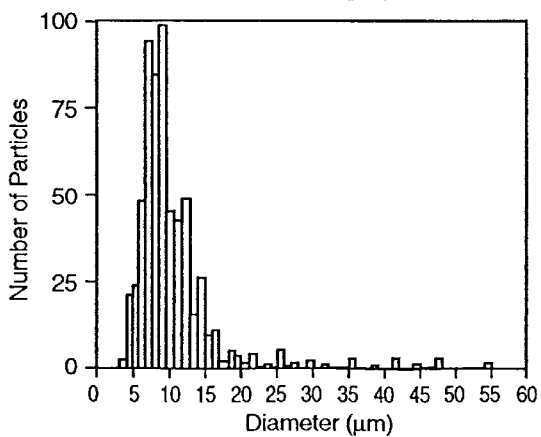

After measuring the volume of the hot zone, the particle density in the hot zone can be determined. This information can be used to determine an expected particle size. The particle size of spherical ceramic oxide produced is related to the collision frequency between melted particles in the plasma hot zone, which is related to the particle density and the particle residence time in the hot zone. The particle density in the hot zone can be adjusted by adjusting the concentration of particles in the aerosol gas. The residence time in the hot zone can be adjusted by adjusting the size of the hot zone. The size of the hot zone, for a particular flow rate, can be controlled by adjusting the microwave power. As FIG. 8 shows, an increase in the microwave power for a steady alumina precursor flow rate results in an increase in particle size. Particles generally reside within the hot zone of the plasma for about 0.001–10 seconds, and preferably for about 0.1 seconds.

Spherical $Al_2O_3$ particles were also found in the collar. These particles were much larger than those recovered in particle trap, and were likely produced from $Al_2O_3$ particles that were trapped in flow fields outside the plasma hot zone. These trapped particles were likely forced out of and then back into the hot zone. This way, they continued to grow by colliding with other melted particles and growing until they became so large that the plasma gas could no longer carry them to the particle trap. Typically, the spheres that are collected in the collar were formed from many powder particles that melt, collide, join and, due to their longer duration inside the plasma hot zone, continue to grow larger and melt further.

Summarizing, the invention includes a method of producing dense oxide ceramic particles having spherical and irregular shapes. In contrast to previous methods, the shape, size, and size distribution of the product particles can be controlled by adjusting a variety of parameters, and the sizes of the product particles are larger than those from which they are formed. Generally, particles of about 10–200 microns are formed using the method of the invention.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of generating ceramic particles, comprising the steps of:
   (a) generating an aerosol comprising precursor ceramic powder particles suspended in plasma gas;
   (b) generating a plasma comprising a plasma hot zone sufficiently hot to melt the precursor ceramic powder particles;
   (c) directing the aerosol into the plasma hot zone and allowing the particles in the hot zone to melt, collide, and join to form larger particles;
   (d) allowing these larger particles to exit the hot zone, whereby they cool and solidify to form a product comprising dense, ceramic particles that are larger than the precursor ceramic particles.

2. The method of claim 1, wherein the ceramic powder comprises at least one oxide ceramic material.

3. The method of claim 2, wherein the oxide ceramic material is selected from the group consisting of alumina, silica, titanium oxide, magnesium oxide, nickel oxide, iron oxide, chromium oxide, manganese oxide, cobalt oxide, zirconium oxide, hafnium oxide, tantalum oxide, niobium oxide, tungsten oxide, lanthanum oxide, cerium oxide, praseodymium oxide, and mixtures thereof.

4. The method of claim 2, wherein the precursor ceramic particles are selected from the group consisting of spherically shaped particles and irregularly shaped powder particles.

5. The method of claim 1, wherein the aerosol comprises ceramic powder particles suspended in plasma gas.

6. The method of claim 5, wherein the aerosol is generated by mechanically dispersing the ceramic particles in a stream of plasma gas.

7. The method of claim 5, wherein the aerosol comprises ceramic powder particles having a desired powder particle density in the plasma gas.

8. The method of claim 7, wherein the particle density in the aerosol is chosen to produce a desired and controlled particle shape, a desired and controlled particle size, and a desired and controlled particle size distribution.

9. The method of claim 8, wherein said powder density is about 0.01–100 grams of powder per liter of aerosol.

10. The method of claim 9, wherein said powder density is 0.5 grams of powder per liter of aerosol.

11. The method of claim 1, wherein the plasma is generated by supplying energy to plasma gas, the plasma gas being selected from the group consisting of air, argon, neon, xenon, nitrogen, oxygen, chlorine, fluorine, hydrogen, and mixtures thereof.

12. The method of claim 11, wherein the energy is generated from a DC discharge.

13. The method of claim 12, wherein the energy is from electromagnetic radiation.

14. The method of claim 13, wherein the electromagnetic radiation is in the radiofrequency (RF) region of the electromagnetic spectrum.

15. The method of claim 14, wherein the electromagnetic radiation is microwave radiation.

16. The method of claim 15, wherein the plasma is generated using about 100–30,000 watts of power.

17. The method of claim 16, wherein the plasma is generated using about 300–1200 watts of power.

18. The method of claim 17, wherein the plasma gas is at a gas pressure of about 0.01–10 atmospheres.

19. The method of claim 18, wherein the plasma gas is at a gas pressure of about 1 atmosphere.

20. The method of claim 1, wherein the aerosol flow rate is adjusted to produce product ceramic particles having a desired particle shape and a controlled particle size/size distribution.

21. The method of claim 1, wherein the ceramic powder resides within the hot zone of the plasma for about 0.001–10 seconds.

22. The method of claim 1, wherein the solidified product particles have an average size of about 10–200 microns.

23. The method of claim 1, wherein said step of cooling includes cooling particles using a gas stream separate from the plasma gas stream and the aerosol gas stream.

24. The method of claim 23 wherein the ceramic powder resides within the hot zone for about 0.1 second.

25. The method of claim 1, wherein the product ceramic particles are spherical ceramic particles.

26. The method of claim 1, wherein said product ceramic particles are irregularly- shaped agglomerates.

27. The method of claim 1, wherein the product ceramic particles comprises spherical ceramic particles.

* * * * *